(12) United States Patent
Agnello et al.

(10) Patent No.: US 10,613,007 B2
(45) Date of Patent: Apr. 7, 2020

(54) EDGE STRENGTH TESTING METHODS AND APPARATUSES

(71) Applicant: CORNING INCORPORATED, Corning, NY (US)

(72) Inventors: Gabriel Pierce Agnello, Corning, NY (US); Chong Pyung An, Painted Post, NY (US); William Kenneth Denson, Big Flats, NY (US); Peter Knowles, Elmira, NY (US); David Bruce Moorehouse, Painted Post, NY (US); Denwood Falconer Ross, III, Kearneysville, WV (US); Correy Robert Ustanik, Davidson, NC (US); Siva Venkatachalam, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 372 days.

(21) Appl. No.: 15/557,991

(22) PCT Filed: Mar. 10, 2016

(86) PCT No.: PCT/US2016/021667
§ 371 (c)(1),
(2) Date: Sep. 13, 2017

(87) PCT Pub. No.: WO2016/149016
PCT Pub. Date: Sep. 22, 2016

(65) Prior Publication Data
US 2018/0073967 A1 Mar. 15, 2018

Related U.S. Application Data

(60) Provisional application No. 62/199,534, filed on Jul. 31, 2015, provisional application No. 62/132,797, filed on Mar. 13, 2015.

(51) Int. Cl.
*G01N 3/20* (2006.01)

(52) U.S. Cl.
CPC ....... *G01N 3/20* (2013.01); *G01N 2203/0076* (2013.01); *G01N 2203/0282* (2013.01)

(58) Field of Classification Search
None
See application file for complete search history.

(56) References Cited

U.S. PATENT DOCUMENTS

| 4,317,368 A | 3/1982 | McElroy |
| 4,346,601 A | 8/1982 | France |

(Continued)

FOREIGN PATENT DOCUMENTS

| JP | 2011202991 A | 10/2011 |
| KR | 835537 B1 | 6/2008 |

(Continued)

OTHER PUBLICATIONS

European Patent Application No. 16765450.8 Search Report dated Oct. 5, 2018; 9 Pages; European Patent Office.

(Continued)

*Primary Examiner* — Natalie Huls
*Assistant Examiner* — Jermaine L Jenkins
(74) *Attorney, Agent, or Firm* — Ryan T. Hardee

(57) ABSTRACT

Apparatus and method for testing a sheet of brittle material comprising the steps of measuring one or more edge features of a sheet of brittle material, imparting a bend to the sheet of brittle material and producing relative motion between the sheet and the bend such that the bend traverses the sheet. A stress can be induced in the sheet as a function of the relative motion and imparted bend, wherein the induced stress corresponds to a predetermined strength value, and the measured one or more edge features can be correlated with the strength value.

30 Claims, 15 Drawing Sheets

(56) References Cited

U.S. PATENT DOCUMENTS

| | | | |
|---|---|---|---|
| 5,115,142 A * | 5/1992 | Taguchi | G01N 21/958 250/548 |
| 6,359,686 B1 | 3/2002 | Ariglio et al. | |
| 6,501,546 B1 | 12/2002 | Weiss | |
| 7,036,364 B2 | 5/2006 | Swillo et al. | |
| 7,461,564 B2 * | 12/2008 | Glaesemann | G01N 3/20 73/862.381 |
| 7,800,748 B2 * | 9/2010 | Sakaguchi | G01N 21/9503 356/237.1 |
| 7,886,453 B2 * | 2/2011 | Ould | G01B 21/042 33/503 |
| 7,920,257 B2 * | 4/2011 | An | C03B 17/064 250/363.01 |
| 8,023,111 B2 | 9/2011 | Hayashi et al. | |
| 8,120,654 B2 | 2/2012 | Okamura | |
| 8,148,338 B2 | 4/2012 | Klinski et al. | |
| 8,284,396 B2 | 10/2012 | Rudert | |
| 8,773,656 B2 | 7/2014 | Hagan et al. | |
| 8,960,014 B2 * | 2/2015 | Sharps | G01M 5/0075 73/760 |
| 9,157,843 B2 * | 10/2015 | Shen | G01N 3/20 |
| 9,380,693 B2 | 6/2016 | Boulos et al. | |
| 9,664,603 B2 * | 5/2017 | Heiss-Chouquet | G01N 3/10 |
| 9,784,655 B2 * | 10/2017 | Heiss-Chouquet | G01N 3/08 |
| 10,101,281 B2 * | 10/2018 | Kinoshita | H01L 21/67706 |
| 10,458,890 B2 * | 10/2019 | Siegel | G01N 19/04 |
| 2005/0066721 A1 | 3/2005 | Swillo et al. | |
| 2008/0083288 A1 | 4/2008 | Glaesemann | |
| 2012/0052302 A1 | 3/2012 | Matusick et al. | |
| 2013/0288010 A1 | 10/2013 | Akarapu et al. | |
| 2014/0065401 A1 * | 3/2014 | Donovan | C03C 21/002 428/220 |
| 2014/0198539 A1 | 7/2014 | Lv et al. | |
| 2014/0268105 A1 | 9/2014 | Bills et al. | |

FOREIGN PATENT DOCUMENTS

| | | |
|---|---|---|
| KR | 1282757 B1 | 7/2013 |
| KR | 2015024081 A | 3/2015 |
| KR | 2015087648 A | 7/2015 |
| WO | 2012153718 A1 | 11/2012 |
| WO | 2014171375 A1 | 10/2014 |

OTHER PUBLICATIONS

Lindquist et al; "Strength of Glass Determined by the Relation of the Critical Flaw to the Fracture Mirror"; Engineering Fracture Mechanics, vol. 119; pp. 43-52.

Veer et al; "The Strength of Glass, Effect of Edge Quality"; (2003) 4 Pages; URL:http://bk.home.tudelft.nl/fileadmin/Faculteit/BK/Onderzoek/Projecten/Glass/Persons/doc/VEER_2003Strength_EffectofEdgeQuality.pdf.

Basu et al; "Is Weibull Distribution the Most Appropriate Statistical Strength Distribution for Brittle Materials?"; Ceramics International; 35 (2009) 237-246.

Griffith et al; "VI. The Phenomena of Rupture and Flow in Solids"; RSTA; vol. CCXXI.-A 587; Published Oct. 21, 1920 pp. 163-198.

Gulati et al; "Edge Strength Testing of Thin Glasses"; International Journal of Applied Galss Science; 2 [1] 39-46 (2011).

Haldimann; "Fracture Strength of Structural Glass Elements—Analytical and Numerical Modelling Testing and Design"; PhD thesis, EPFL 2671, 2006; 222 Pages.

International Search Report and Written Opinion of the International Searching Authority; PCT/US2016/021667; dated May 27, 2016; 18 Pages; Korean Patent Office.

Lu et al; "Fracture Statistics of Brittle Materials: Weibull or Normal Distribution"; Physical Review E, vol. 65, 067102-1-067102-4 (2002).

Mauro et al; "Unified Physics of Stretched Exponential Relaxation and Weibull Fracture Statistics"; Physica A 391 (2012) 6121-6127.

Weibull; "A Statistical Theory on the Strength of Materials" Royal Swedish Institute for Engineering Research; vol. 151, 1939.

* cited by examiner

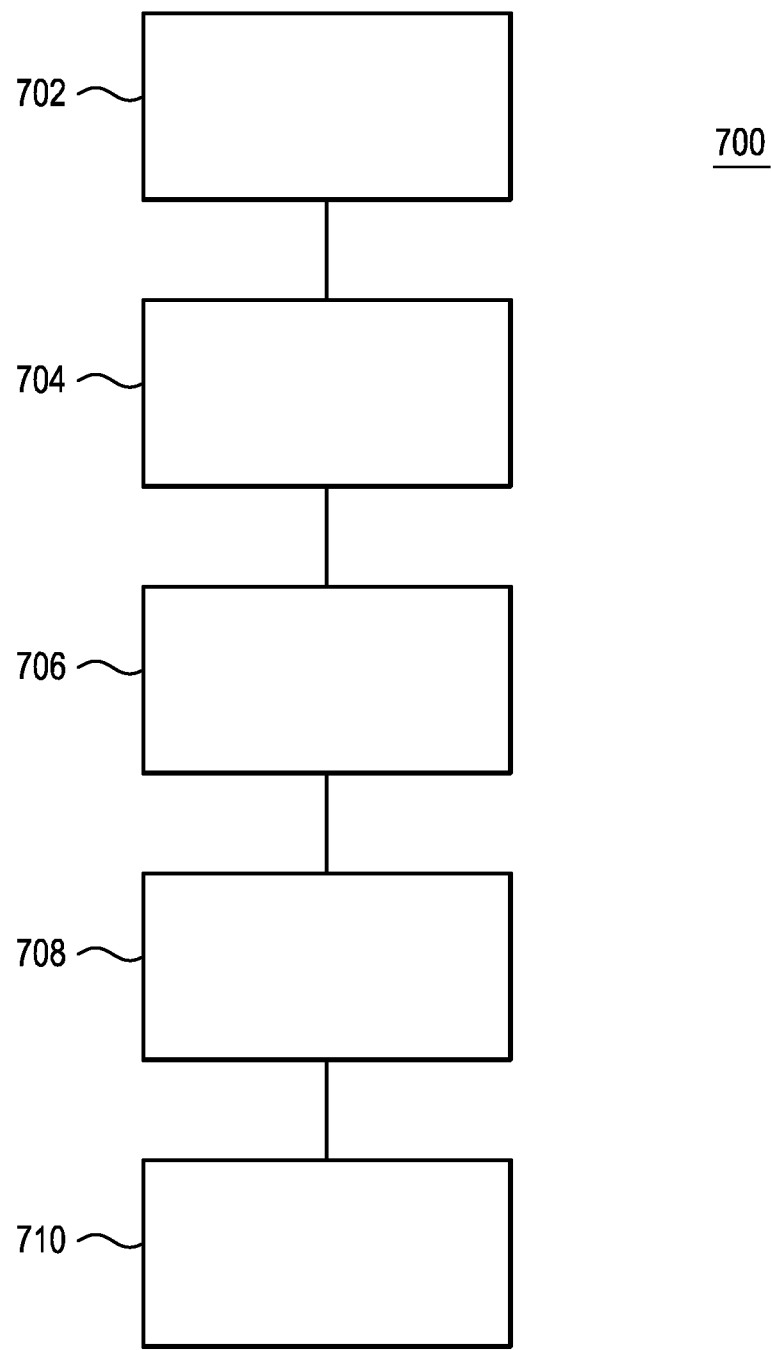

EDGE STRENGTH TESTING METHODS AND APPARATUSES

CROSS-REFERENCE TO RELATED APPLICATIONS

This application claims the benefit of priority under 35 U.S.C. § 371 of International Patent Application Serial No. PCT/US16/21667 filed on Mar. 10, 2016, which in turn, claims the benefit of priority of U.S. Provisional Application Ser. No. 62/199,534 filed on Jul. 31, 2015 and claims the benefit of priority of U.S. Provisional Application Ser. No. 62/132,797 filed on Mar. 13, 2015, the contents of each of which are relied upon and incorporated herein by reference in their entireties.

FIELD OF THE DISCLOSURE

The present disclosure relates generally to testing methods and apparatuses for glass and/or glass ceramics.

BACKGROUND

High-performance display devices, such as liquid crystal displays (LCDs) and plasma displays, are commonly used in various electronics, such as cell phones, laptops, electronic tablets, televisions, and computer monitors. Currently marketed display devices can employ one or more high-precision glass sheets, for example, as substrates for electronic circuit components, or as color filters, to name a few applications. The leading technology for making such high-quality glass substrates is the fusion draw process, developed by Corning Incorporated, and described, e.g., in U.S. Pat. Nos. 3,338,696 and 3,682,609, which are incorporated herein by reference in their entireties; however, embodiments described herein are applicable to any forming process including slot draw, redraw, float, and the like.

For each of these applications, a glass sheet is typically cut to size, and then resulting sharp edges of the glass sheet are beveled by grinding and/or polishing. Cutting, edge machining, grinding and other processing steps can introduce flaws, such as chips or cracks, at surfaces and edges of the glass sheet. These flaws can serve as fracture sources and thereby reduce the strength of the sheets, particularly if the glass is flexed such that the flaw experiences tensile stress. Non-flexible display devices experience some flexing, thus the existence of these flaws may be of concern. Flexible display devices by their very nature, may produce significant stress in the display substrate(s), either during the manufacturing process or in use. Thus, flaws that might be present in the glass may experience stresses sufficiently great that the glass will crack. Since typical display manufacturing involves cutting the glass to form individual displays, and cutting is known to create multiple flaws in the glass along the cut edge, glass substrate-based flexible display devices may have a higher probability of fracture.

Attempts to mitigate flaws at the edges of glass sheets have included laser cutting, grinding, polishing and so forth, all in the attempt to remove or minimize the flaws that are created when the glass sheet is cut to size. However, many of these approaches are unsatisfactory either because the technique is incapable of removing flaws down to the size needed for the expected stresses or because the technique is difficult to apply such thin glass sheets (less than about 0.4 mm thick). Acid etching of glass edges may be used, but this may degrade the display device disposed on the substrate. Thus, flaws will continue to be formed in glass sheets, in particular at the edges of the sheet, and there is a need in the industry to accurately test edge strength of such glass sheets and panels or laminate structures using such glass sheets.

SUMMARY

Exemplary embodiments will be described directed to methods for the continuous measurement of the breaking strength of a glass edge by putting the edge under stress, such that stresses away from the edge are significantly less than the breaking strength at their respective locations. Additionally, using exemplary embodiments both sides of an edge can be subject to substantially the same tensile stress during the measurement. Additionally, exemplary embodiments provide a continuous high speed nature which results in at least a 30× increase in processing speed, at least a 3× increase in the amount of edge tested, and orders of magnitude of sheets processed and tested. This increase in statistical sampling can thus guarantee less leakage to the customer and is amenable to online configurations.

In some embodiments a method of testing a sheet of brittle material is provided. The method can include the steps of measuring one or more edge features of a sheet of brittle material, imparting a bend to the sheet of brittle material, producing relative motion between the sheet and the bend such that the bend traverses the sheet, inducing a stress in the sheet as a function of the relative motion and imparted bend, wherein the induced stress corresponds to a predetermined strength value, and correlating the measured one or more edge features with the strength value. In some embodiments, the step of measuring one or more edge features occurs before the steps of imparting a bend to the sheet, producing relative motion, and inducing a stress in the sheet. In other embodiments, the step of producing relative motion further comprises passing the sheet of brittle material between at least two opposing assemblies each having one or more arcuate members thereon. In additional embodiments, a first of the at least two opposing assemblies has a single arcuate member engaging a first side of the sheet and a second of the at least two opposing assemblies has two arcuate members engaging a second side of the sheet in opposition to the first side. In some embodiments, the step of producing relative motion further comprises engaging the sheet with the one or more arcuate members at a distance no more than about 2 mm from an edge of the sheet. Exemplary arcuate members can have a diameter of about 9 mm and/or can comprise a compliant material. In some embodiments, the step of measuring further comprises optically detecting data for one or more edge features of the sheet and providing strength distributions for each feature. Exemplary edge features can be, but are not limited to an A-bevel, a B-bevel, and an apex of an edge of the sheet. In other embodiments, the relative motion occurs over the length of the sheet up to five mm or less from an edge orthogonal to the relative motion. Exemplary brittle materials include, but are not limited to, a glass or a glass ceramic. The sheet can have a length ranging from about 600 mm to 4000 mm and a width ranging from about 600 mm to 4000 mm and/or a thickness of less than 0.1 mm or ranging from about 0.1 mm to about 3 mm. In some embodiments, the step of inducing a stress in the sheet further comprises monitoring for fracture of the sheet and controlling the imparted bend as a function of said monitoring. An exemplary relative motion can range from about 50 mm/sec to about 500 mm/sec.

In other embodiments, a method of proof testing a sheet of brittle material is provided. The method can comprise the steps of measuring one or more edge features of a sheet of brittle material, imparting a bend to the sheet and producing relative motion between the sheet and the bend such that the bend traverses the sheet, inducing a stress in the sheet as a function of the relative motion and imparted bend, wherein the induced stress corresponds to a predetermined strength value, and correlating the measured one or more edge features with the strength value to detect edge features that correspond to edge strengths less than or greater than the predetermined strength value. In some embodiments, the step of measuring further comprises optically detecting data for one or more surface or edge features of the sheet and providing strength distributions for each feature. In other embodiments, the one or more surface or edge features is selected from the group consisting of an A-bevel, a B-bevel, and an apex of an edge of the sheet. Exemplary brittle materials include, but are not limited to, a glass or a glass ceramic.

In further embodiments, an apparatus for testing a sheet of brittle material is provided. The apparatus can comprise detection mechanisms for measuring one or more edge features of a sheet of brittle material, a plurality of assemblies for imparting a bend to the sheet of brittle material, producing relative motion between the sheet and the bend such that the bend traverses the sheet, and inducing a stress in the sheet as a function of the relative motion and imparted bend, wherein the induced stress corresponds to a predetermined strength value, and circuitry for correlating the measured one or more edge features with the strength value. In some embodiments, a first of the plurality of assemblies has a single arcuate member engaging a first side of the sheet and a second of the plurality of assemblies has two arcuate members engaging a second side of the sheet in opposition to the first side. In other embodiments, the arcuate members have a diameter of about 9 mm and comprise a compliant material. Exemplary detection mechanisms can include cameras for optically detecting data for one or more edge features of the sheet and providing strength distributions for each feature.

In a further embodiment, a method of testing a sheet of brittle material is provided comprising the steps of measuring one or more features of a sheet of brittle material, imparting a bend to the sheet of brittle material, producing relative motion between the sheet and the bend such that the bend traverses the sheet, inducing a stress in the sheet as a function of the relative motion and imparted bend, wherein the induced stress corresponds to a predetermined strength value, and correlating the measured one or more features with the strength value.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals where possible and in which:

FIG. 7 is a block diagram of some embodiments of the present subject matter;

DETAILED DESCRIPTION

Figure 1:
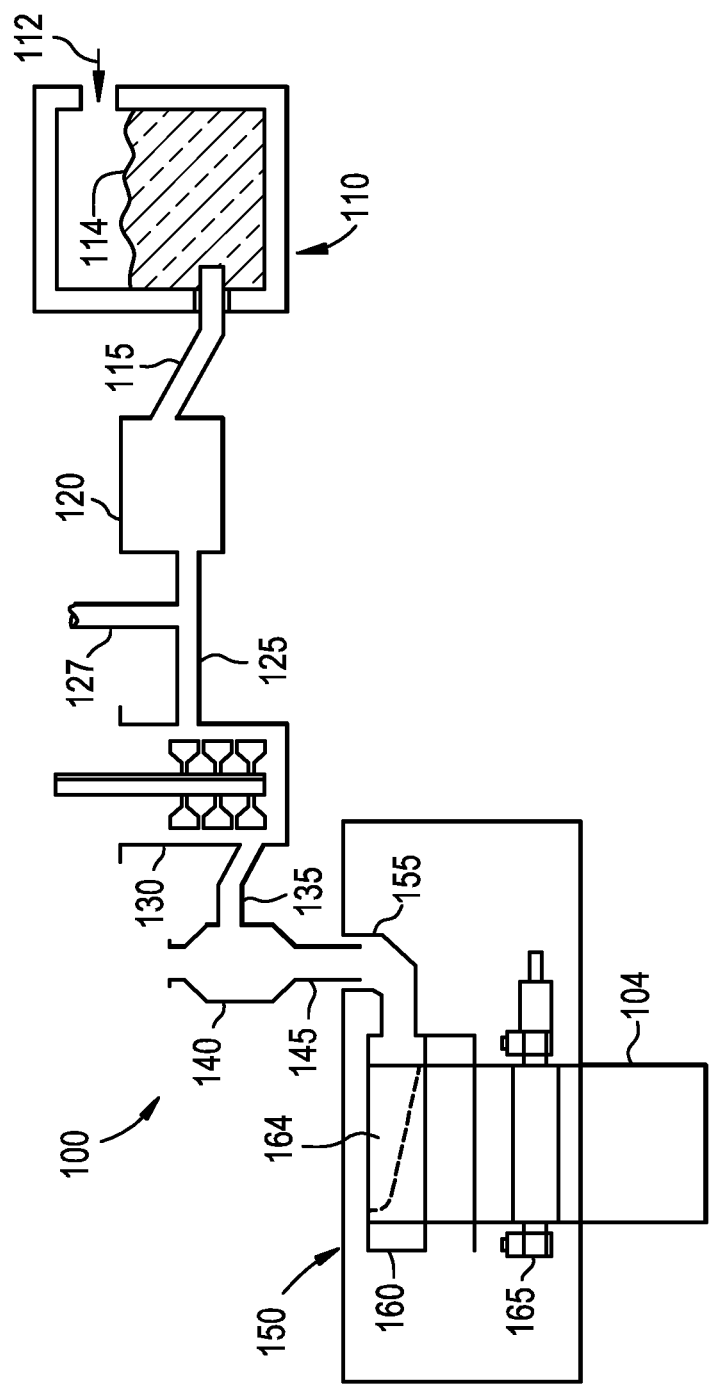
FIG. 1 illustrates an exemplary glass manufacturing system.

Embodiments of the present disclosure will be discussed with reference to FIG. 1, which depicts an exemplary glass manufacturing system 100 for producing a glass ribbon 104. The glass manufacturing system 100 can include a melting vessel 110, a melting to fining tube 115, a fining vessel (e.g., finer tube) 120, a fining to stir chamber connecting tube 125 (with a level probe stand pipe 127 extending therefrom), a mixing vessel (e.g., stir chamber (static or dynamic)) 130, a stir chamber to bowl connecting tube 135, a delivery vessel (e.g., bowl) 140, a downcomer 145, and a FDM 150, which can include an inlet 155, a forming body (e.g., isopipe) 160, and a pull roll assembly 165.

Glass batch materials can be introduced into the melting vessel 110, as shown by arrow 112, to form molten glass 114. The term "batch materials" and variations thereof are used herein to denote a mixture of glass precursor components which, upon melting, react and/or combine to form a glass. The glass batch materials may be prepared and/or mixed by any known method for combining glass precursor materials. For example, in certain non-limiting embodiments, the glass batch materials can comprise a dry or substantially dry mixture of glass precursor particles, e.g., without any solvent or liquid. In other embodiments, the glass batch materials may be in the form of a slurry, for example, a mixture of glass precursor particles in the presence of a liquid or solvent. According to various embodiments, the batch materials may comprise glass precursor materials, such as silica, alumina, and various additional oxides, such as boron, magnesium, calcium, sodium, strontium, tin, or titanium oxides. For instance, the glass batch materials may be a mixture of silica and/or alumina with one or more additional oxides. In various embodiments, the glass batch materials comprise from about 45 to about 95 wt % collectively of alumina and/or silica and from about 5 to about 55 wt % collectively of at least one oxide of boron, magnesium, calcium, sodium, strontium, tin, and/or titanium. The fining vessel 120 can be connected to the melting vessel 110 by the melting to fining tube 115. The fining vessel 120 can have a high temperature processing area that receives the molten glass from the melting vessel 110 and which can remove bubbles from the molten glass. The fining vessel 120 can be connected to the stir chamber 130 by the fining to stir chamber connecting tube 125. The stir chamber 130 can be connected to the bowl 140 by the stir chamber to bowl connecting tube 135. The bowl 140 can deliver the molten glass through the downcomer 145 into the FDM 150.

The FDM 150 can include an inlet 155, a forming body 160, and a pull roll assembly 165. The inlet 155 can receive the molten glass from the downcomer 145, from which it can flow to the forming body apparatus 160, where it is formed into a glass ribbon 104. The pull roll assembly 165 can deliver the drawn glass ribbon 104 for further processing by additional optional apparatuses. For example, the glass ribbon can be further processed by a traveling anvil machine (TAM), which can include a mechanical scoring device for scoring the glass ribbon. The scored glass can then be separated into pieces of glass sheet, machined, polished, chemically strengthened, and/or otherwise surface treated, e.g., etched, using various methods and devices known in the art. While a fusion forming process has been heretofore described, the claims appended herewith should not be so limited as embodiments are applicable to any forming process including, but not limited to, slot draw, redraw, float, and the like.

As noted above, a glass sheet can be typically cut to size, and then resulting sharp edges of the glass sheet are beveled by grinding and/or polishing during subsequent finishing processing. During these subsequent finishing, handling or other manipulating steps, an edge stress may be imparted on the glass sheet whereby the glass sheet may break potentially causing a severe disruption in the glass manufacturing or a user's production line. For this reason, edge strength may be tested in the manufacturing plant after production. A conventional method of edge strength testing is four point vertical bending (V4PTB). V4PTB tests small samples or coupons, roughly 150 mm long by 10 mm wide, which must be cut from a main glass sheet and tested individually. This is a manually intensive method which takes about one day to process the samples from one sheet and hence very few sheets are ever tested, e.g., on the order of about three sheets for every 22,000 sheets produced. Further, such methods are unable to evaluate laminate structures or panels. Such shortcomings can result in significant leakage in the form of bad product reaching a customer.

Embodiments of the present subject matter provide an approach to characterizing edge flaw populations through simultaneous constant vertical loading and lateral motion normal to the tensile axis using an exemplary roller system. Through the adaptation of Weibull statistics, dynamically obtained failure data can be expressed and correlated with individual or plural V4PTB measurement sets. Such data can be an invaluable metric for glass reliability, and edge strength statistics using exemplary embodiments can also provide useful engineering feedback because the flaw population at the edge is closely related to the finishing process.

Figure 2:
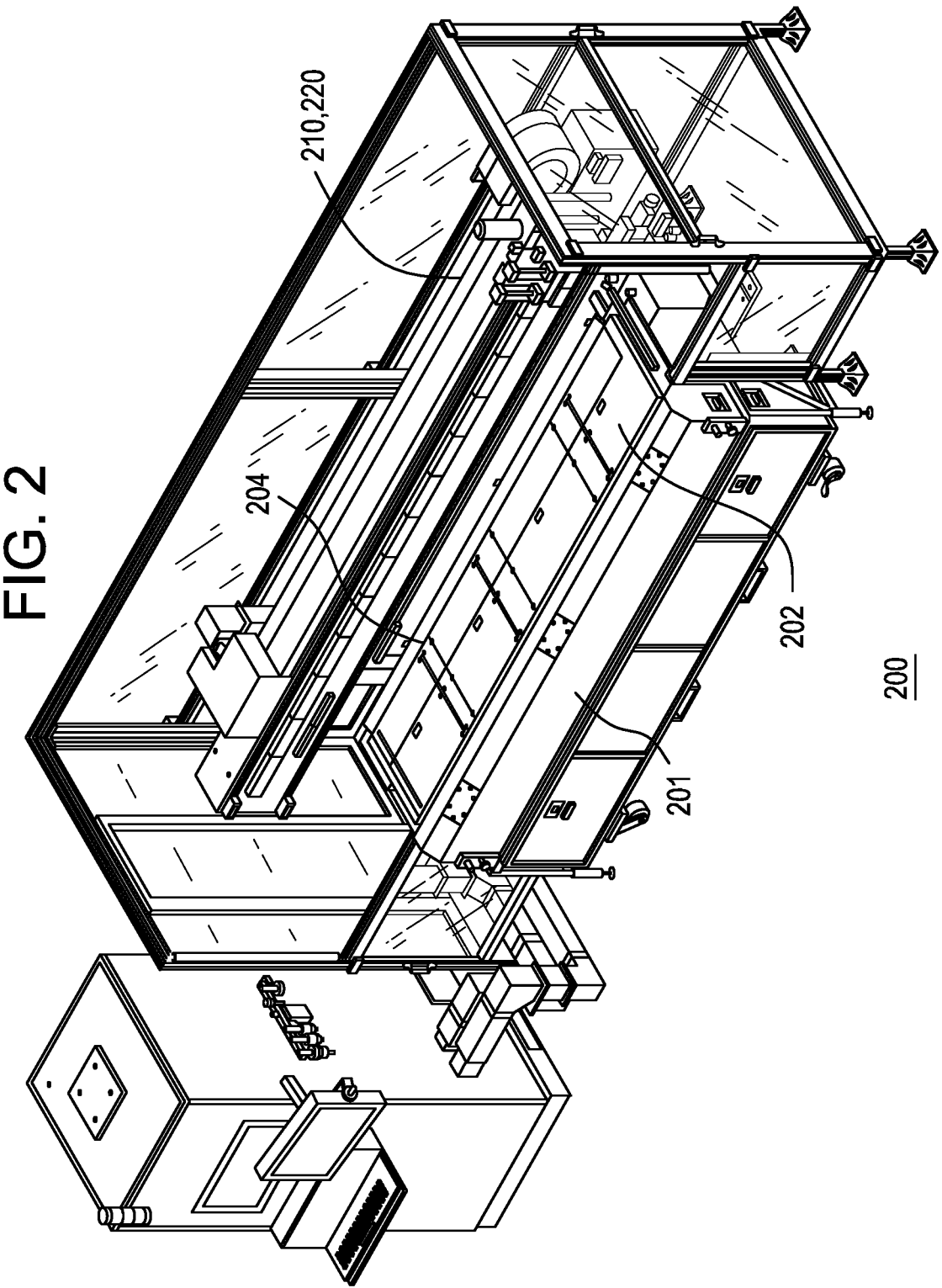
FIG. 2 is a perspective view of an exemplary edge strength measurement system according to some embodiments.

FIG. 2 is a perspective view of an exemplary edge strength measurement system according to some embodiments. With reference to FIG. 2, an exemplary edge strength measurement system (ESMS) 200 may be configured as an offline system (as shown in FIG. 2) or as an online system (e.g., a component of a finishing line which accepts glass directly from a finishing station or line) and may comprise a planar surface or table 202 configured to accept or accommodate a glass sheet 204 for measurement purposes. It should be noted that while some embodiments are described with reference to a glass sheet 204, the claims appended herewith should not be so limited as an exemplary ESMS 200 can be utilized to accept or accommodate and analyze laminate structures or panels. Suitable laminate structures can include plural glass sheets having one or more intermediate polymeric layers or can also, in alternative embodiments, include a structure having a thin film transistor glass substrate and color filter glass substrate having one or more films therebetween or adjacent to either or both substrates. Thus, where reference is made to a glass sheet 204 herein, reference can also be made to laminate structures and panels; however, for brevity sake, reference will only be made to a glass sheet 204 herein. A cullet cute and disposal bin 201 may also be provided in some embodiments for disposal of glass sheets as necessary. The glass sheet 204 may have length/width dimensions ranging from about 600 mm/600 mm, to about 2300 mm/2600 mm, to about 4000 mm/4000 mm and all subranges therebetween. Glass sheets in panels or laminate structures may also have length/width dimensions ranging from about 600 mm/600 mm, to about 2300 mm/2600 mm, to about 4000 mm/4000 mm and all subranges therebetween. Further, adjacent glass sheets in panels or laminate structures may have different length/width dimensions which can result in an overlap of one sheet on the other and on one or more sides of such sheets. Exemplary glass thicknesses for single glass sheets or each glass sheet contained in a panel or laminate structure can be less than 0.1 mm (e.g., as low as 0.01 mm) to thicknesses greater than 5 mm, between 0.1 mm to 3 mm, between 0.4 mm to 2 mm, between 0.5 mm to 1 mm, between 0.5 mm to 0.7 mm. The table 202 may be comprised of any suitable material including but not limited to steel, carbon fiber, and the like. The table 202 may include a plurality of driving mechanisms which are configured to move the glass sheet 204 into a predetermined position to commence a measurement cycle. Upon achieving said predetermined position, in some embodiments one or more alignment pins (not shown) may engage when the driving mechanism(s) are energized to precisely align the edges of the glass sheet 204 so that a predetermined portion of the edge of the glass sheet is in contact with an exemplary edge strength module assembly 210 and aligned with an exemplary optical sensor module or suite 220. In some embodiments, this predetermined portion ranges from about 1 mm to about 5 mm, from about 1.5 mm to about 3.5 mm, from about 2 mm to about 3 mm, and all subranges therebetween. In one embodiment, only the final 2 mm of the surface of the glass sheet is in contact with roller assemblies contained in an exemplary edge strength module assembly 210 to ensure stress concentration is at the glass sheet edge as well as to minimize opportunity of rolling over particles which could create surface cracks. In embodiments where panels or laminate structures are measured for edge strength and where adjacent glass sheets in these panels or laminate structures are different (e.g., one or more edges of the structure have an overlapping feature), then the predetermined portion is measured with respect to the smaller of the glass sheets in the structure (i.e., the non-overlapping sheet).

Figure 3A:
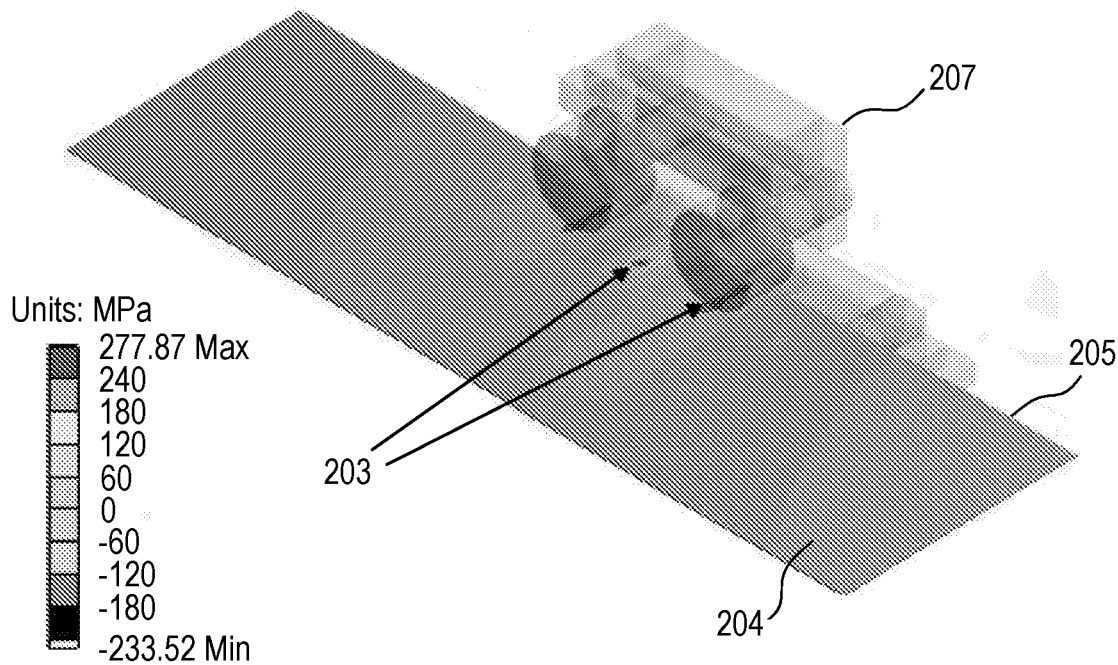
FIGS. 3A and 3B are illustrations of stress profiles for exemplary roller assembly contact with a sheet of glass.
Figure 3B:
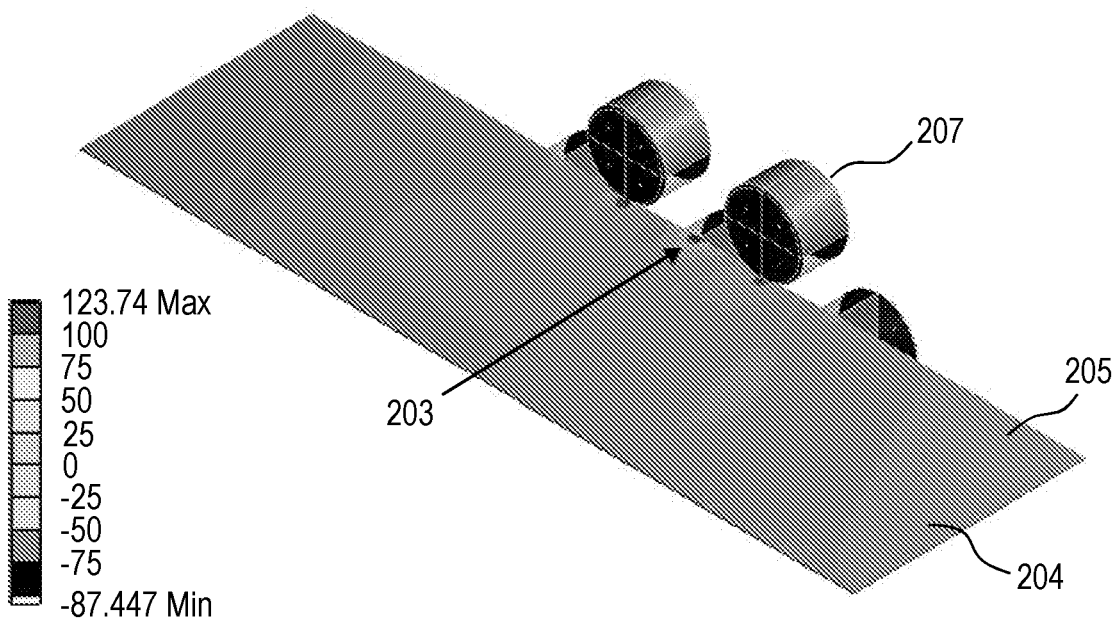

FIGS. 3A and 39 are illustrations of stress profiles for exemplary roller assembly contact with a sheet of glass. With reference to FIG. 3A, an exemplary roller assembly 207 having a rigid roller (described below) in an edge strength module assembly 210 can be observed engaging a glass sheet 204 at a 10 mm from edge contact area. This contact provides a high stress concentration area 203 under the rollers rather than at the edge 205 of the glass sheet 204 in excess of 180 MPa and even greater than 240 MPa with a maximum observed stress of about 277 MPa. Conversely and with reference to FIG. 3B, an exemplary roller assembly 207 having a non-rigid roller (described below) in an edge strength module assembly 210 can be observed engaging a glass sheet 204 at a 2 mm from edge contact area. This contact provides maximum stress at the edge 205 of the glass sheet 204 and focused in a small area 203. The stress concentration at the edge was observed to be between 50 and 100 MPa with a maximum observed stress of about 123 MPa. Additional experimentation was conducted and it was discovered that when the roller material was rigid with a contact area 2 mm from the edge, the high stress concentration still occurred at the edge of the glass sheet and was between 50-100 MPa.

Figure 4:
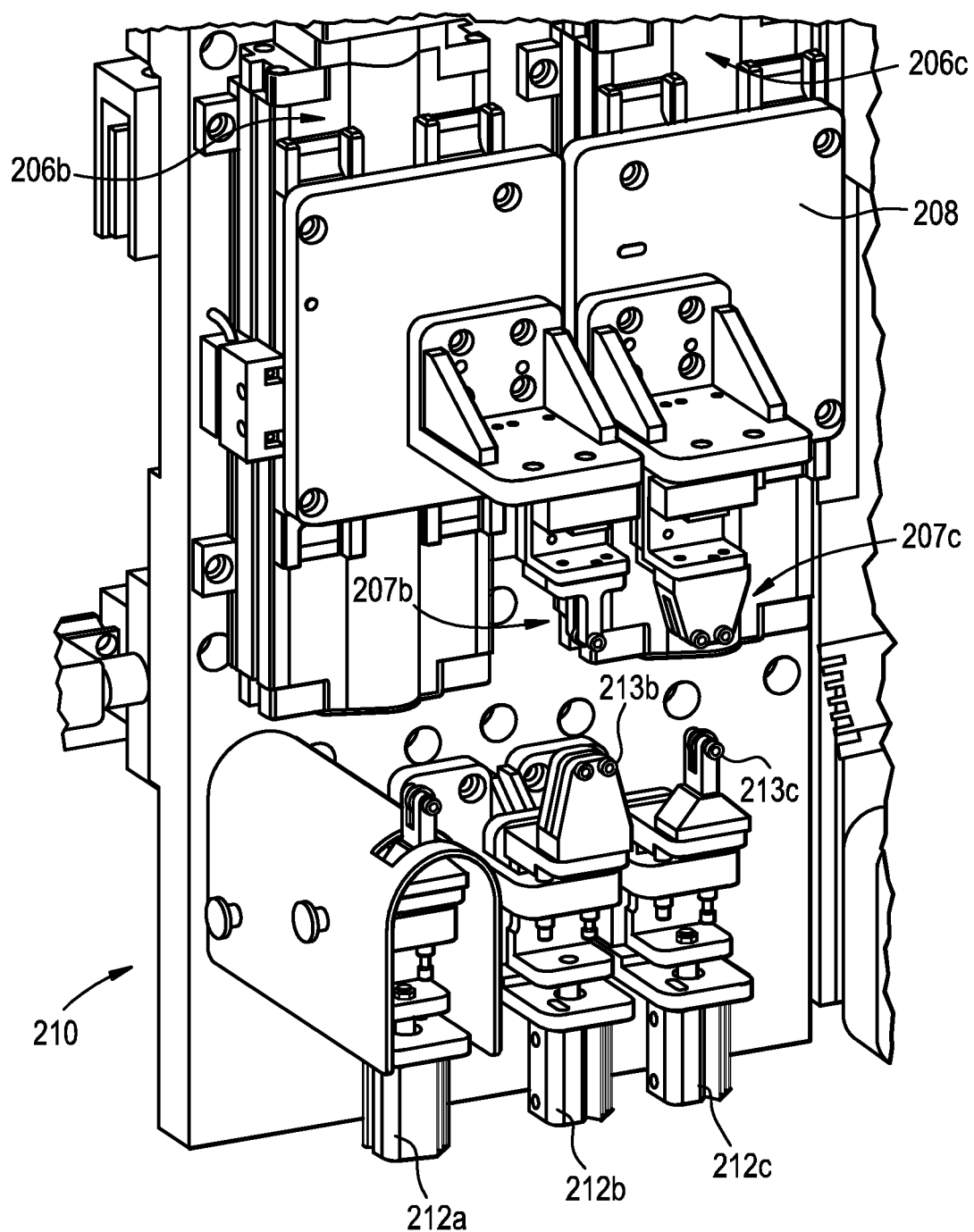
FIG. 4 is a perspective view of an edge strength module assembly for the system of FIG. 2.

FIG. 4 is a perspective view of an edge strength module assembly for the system of FIG. 2. With reference to FIG. 4, an exemplary edge strength module assembly 210 can include a plurality of linear drives mechanisms 206b-c. For example, in some embodiments, the assembly 210 can include an X-axis drive mechanism (not shown) responsible for motion of rollers across a length of a glass edge to be measured. The assembly 210 can also include two Y-axis drive mechanisms 206b, 206c responsible for downward or Y-axis motion of upper roller assemblies 207b, 207c into a glass sheet (not shown). The roller assemblies 207b, 207c may include arcuate members adaptable to span a portion of an adjacent glass sheet. In some embodiments, a first Y-axis drive mechanism 206b is movably fixed to a first upper roller assembly 207b having a single arcuate member or roller configured to rotate about an axis orthogonal to an axis of the first Y-axis drive mechanism 206b and a second Y-axis drive mechanism 206c is movably fixed to a second upper roller assembly 207c having two arcuate members or rollers configured to rotate about parallel axes orthogonal to an axis of the second Y-axis drive mechanism 206c. Exemplary drive mechanisms may be any suitable pneumatic, electrical, rotary, or other suitable device configured to allow, control, and/or monitor a respective roller assembly interaction with an adjacent glass sheet. The Y-axis drive mechanisms 206b, 206c may be movably fixed to respective roller assemblies 207b, 207c using any suitable frames, joints, elbows or other structures 208.

In additional embodiments, the assembly 210 may also include a plurality of drive or pneumatic mechanisms 212a-c in opposite relation to the Y-axis drive mechanisms 206b, 206c described above. For example, the assembly 210 may include a third drive or pneumatic mechanism 212b opposing the first Y-axis drive mechanism 206b. The third drive or pneumatic mechanism 212b may be movably fixed to a third roller assembly 213b having two arcuate members or rollers configured to rotate about parallel axes orthogonal to an axis of the third drive or pneumatic mechanism 212b and/or to the axis of the first Y-axis drive mechanism 206b. The assembly 210 may also include a fourth drive or pneumatic mechanism 212c opposing the second Y-axis drive mechanism 206c. The fourth drive or pneumatic mechanism 212c may be movably fixed to a fourth roller assembly 213c having a single arcuate member or roller configured to rotate about an axis orthogonal to an axis of the fourth drive or pneumatic mechanism 212c and/or to the axis of the second Y-axis drive mechanism 206c. The roller assemblies 213b, 213c may include arcuate members adaptable to span a portion of an adjacent glass sheet. The assembly 210 can also include a fifth drive or pneumatic mechanism 212a which can be used to support a portion of the glass sheet, that is, to prevent sag in a portion of the glass sheet and which can also include a roller assembly having one or more arcuate members adaptable to span a portion of an adjacent glass sheet. While only one sag prevention mechanism 212a is shown, it is envisioned that a plurality of such mechanisms may be provided throughout an exemplary ESMS to prevent sag of an attendant glass sheet and the depiction of a single mechanism should not limit the scope of the claims appended herewith. In some embodiments, any one or several of the mechanisms may be attached to pneumatic actuators for an on/off state. As illustrated, during testing and measurement, a glass sheet (see FIGS. 2, 5A and 5B) may be fed between opposing roller assemblies whereby the glass is pinched between the opposing upper and lower assemblies (i.e., each pair of which can create an independent three roller assembly, e.g., 207c, 213c and 207b, 213b).

In some embodiments, the arcuate members in each or any roller assembly can be compliant to minimize the risk of creating a break on the glass surface rather than the edge as the arcuate member traverses the glass surface adjacent to the edge. The arcuate members or rollers can be selected to have sufficient compliance while being able to provide a long life to minimize maintenance and downtime as well as sufficient friction to allow the roller to roll freely on the glass surface. Exemplary ESMS arcuate member materials can include hardened steel rollers, steel rollers, urethane rollers, polyetheretherketone (PEEK) rollers, Shore 80 hardness urethane rollers, polycarbonate (PC) rollers (e.g., Lexan or the like), high-density polyethylene (HPDE) rollers, Shore 90 hardness urethane rollers, urethane coated rollers, or the like. Exemplary urethane rollers can also be employed to reduce rolling noise which can contaminate any signals used by the system, feedback or otherwise. Additionally, urethane or urethane coated rollers can be used to accommodate debris in the roller path and to make y-direction stress profiles have no inboard stress concentrations. In embodiments used to measure edge strength of panels and laminate structures, it was discovered that rollers having less compliance (e.g., PC, HPDE, etc.) were required to achieve adequate edge strength testing results.

Exemplary dimensions for each arcuate member or roller can vary for embodiments of the present subject matter. For example, roller dimensions can range from a 5 mm to a 15 mm outside diameter (OD), from a 7 mm to a 12 mm OD, from a 9 mm to a 10 mm OD. In some embodiments, an exemplary roller dimension can be about 9 mm OD so that stress can be applied nearly all the way to a corner of a glass sheet which is important as many customer issues occur in this area. Exemplary systems can also traverse a glass edge at speeds ranging from 50 mm/s to 500 mm/s or more, or from 200 mm/s to 400 mm/s or more. Exemplary systems do not have any limitations with regards to glass thickness and thus can be used on glass having a thicknesses less than 0.1 mm (e.g., as low as 0.01 mm) to thicknesses greater than 5 mm, between 0.1 mm to 3 mm, between 0.4 mm to 2 mm, between 0.5 mm to 1 mm, between 0.5 mm to 0.7 mm.

Figure 5A:
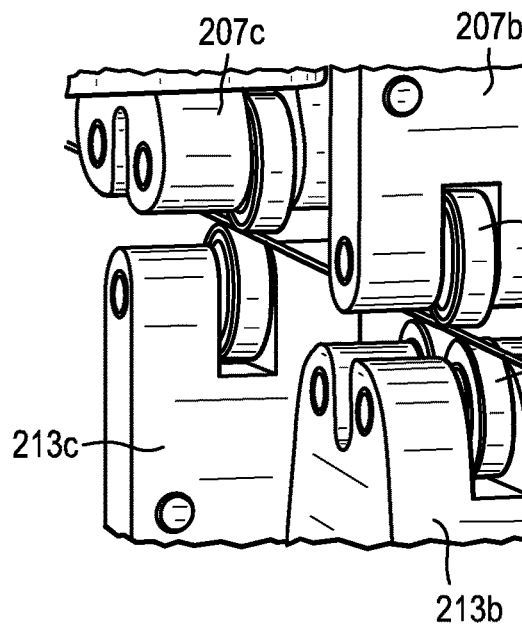
FIGS. 5A-5E are simplified depictions of roller configurations of some embodiments.
Figure 5B:
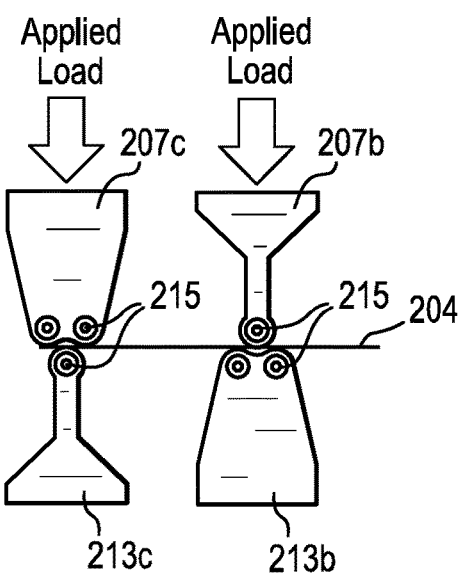
Figure 5C:
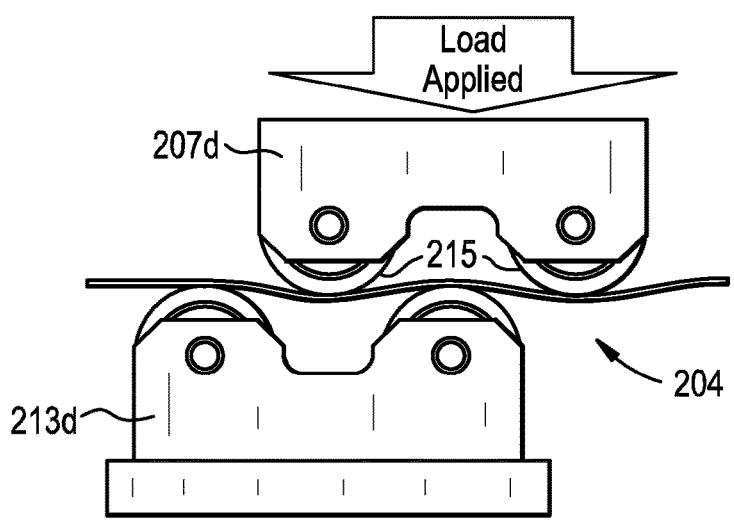
Figure 5D:
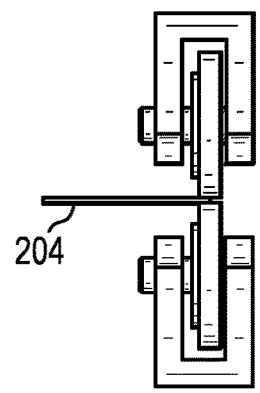
Figure 5E:
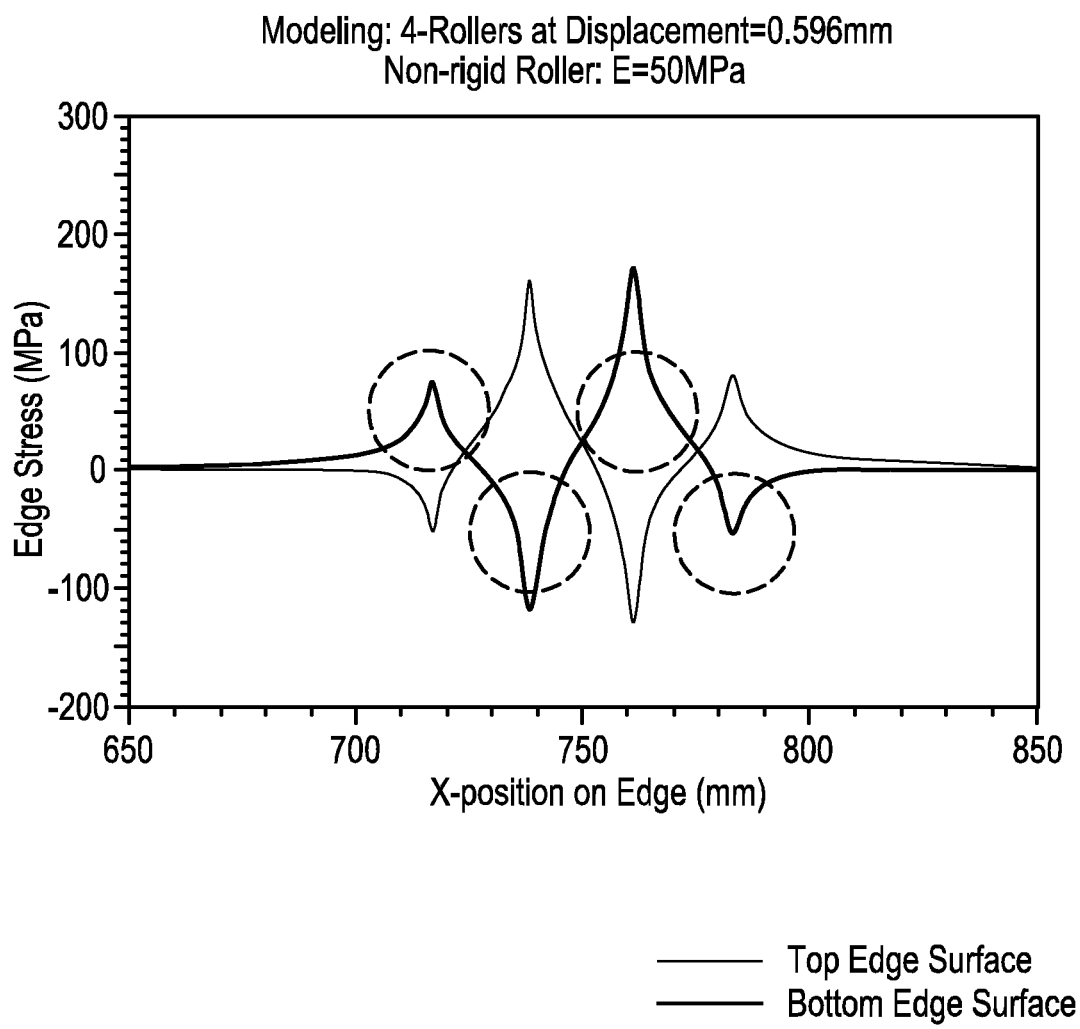

FIGS. 5A and 5B are perspective and plan views of an exemplary roller configuration depicted in FIG. 4 and described above. With reference to FIGS. 5A and 5B, the roller assemblies 207b, 207c, 213b, 213c and respective arcurate members 215 are shown in relation to an adjacent sheet of glass 204 and respective edge 205. Again, it should be noted that while some embodiments are described with reference to a glass sheet 204, the claims appended herewith should not be so limited as an exemplary ESMS 200 can be utilized to accept or accommodate and analyze laminate structures or panels. Suitable laminate structures can include plural glass sheets having one or more intermediate polymeric layers or can also, in alternative embodiments, include a structure having a thin film transistor glass substrate and color filter glass substrate having one or more films therebetween or adjacent to either or both substrates. As glass sheets used in the manufacture of flat panel displays must meet stringent surface quality requirements, contacting the serviceable or "quality" areas of the sheet may impart surface defects that make the sheet unusable. The quality area can be defined as the area inboard of any area contacted during processing. Consequently, exemplary arcuate members 215 may be adapted such that only the peripheral regions or edges 205 of the sheet 204 are contacted by the arcuate member 215 on at least one side of the sheet, proximate the outer edges of the sheet. Such a configuration is shown in FIGS. 5A, 5B, and 5D where the glass sheet 204 is illustrated passing between and pinched by opposing edge rollers. This arrangement preserves the surface quality on both sides of the glass sheet 204. In additional embodiments, a high speed closed loop stress control mechanism can be employed to detect cracks as well as ensure applied stress is within a predetermined value of a target, e.g., MPa of target. For example, a load can be applied to a glass sheet 204 using upper roller assemblies 207b, 207c whereby a load cell signal can be sent to a high speed controller (not shown) which continuously monitors for cracks. This load cell signal can also be used to control the applied load while traversing the edge at a predetermined speed (e.g., 100 mm/sec to 500 mm/sec or more). While there are two independent three-roller assemblies shown in FIGS. 5A and 5B, this should not limit the scope of the claims appended herewith; however, the configuration depicted in these figures can allow for precision stress control for both the A and B sides of the glass and has been discovered to enable a very high throughput. FIGS. 5C and 5D illustrate another embodiment having upper and lower roller assemblies 207d, 213d each with two arcuate members 215. Similar to the three point embodiment depicted in FIGS. 5A and 5B, a load can be applied to a glass sheet 204 using one or more upper roller assemblies 207d whereby a load cell signal can be sent to a high speed controller (not shown) which continuously monitors for cracks and can be used to control the applied force while traversing the edge at 100 mm/sec or more. The glass sheet 204 can bend around the rollers putting the top and bottom surfaces of the edge (see FIG. 5D) in tension as shown in FIG. 5E which illustrate that equivalent tensile stresses are provided on both sides of the glass sheet edge during the course of measurements. It should be noted that the roller assembly geometries depicted in FIGS. 5A-5E should not limit the scope of the claims appended herewith as any suitable roller assembly geometry is envisioned. For example, it was discovered that to achieve acceptable edge strength measurements of glass sheets having a thickness less than 0.2 mm and less than 0.1 mm required smaller geometries. That is, it was found that the roller diameters were required to be reduced and the distance between such rollers was also required to be reduced as stiffness of a glass sheet is generally a function of the cube of glass sheet thickness.

Figure 6A:
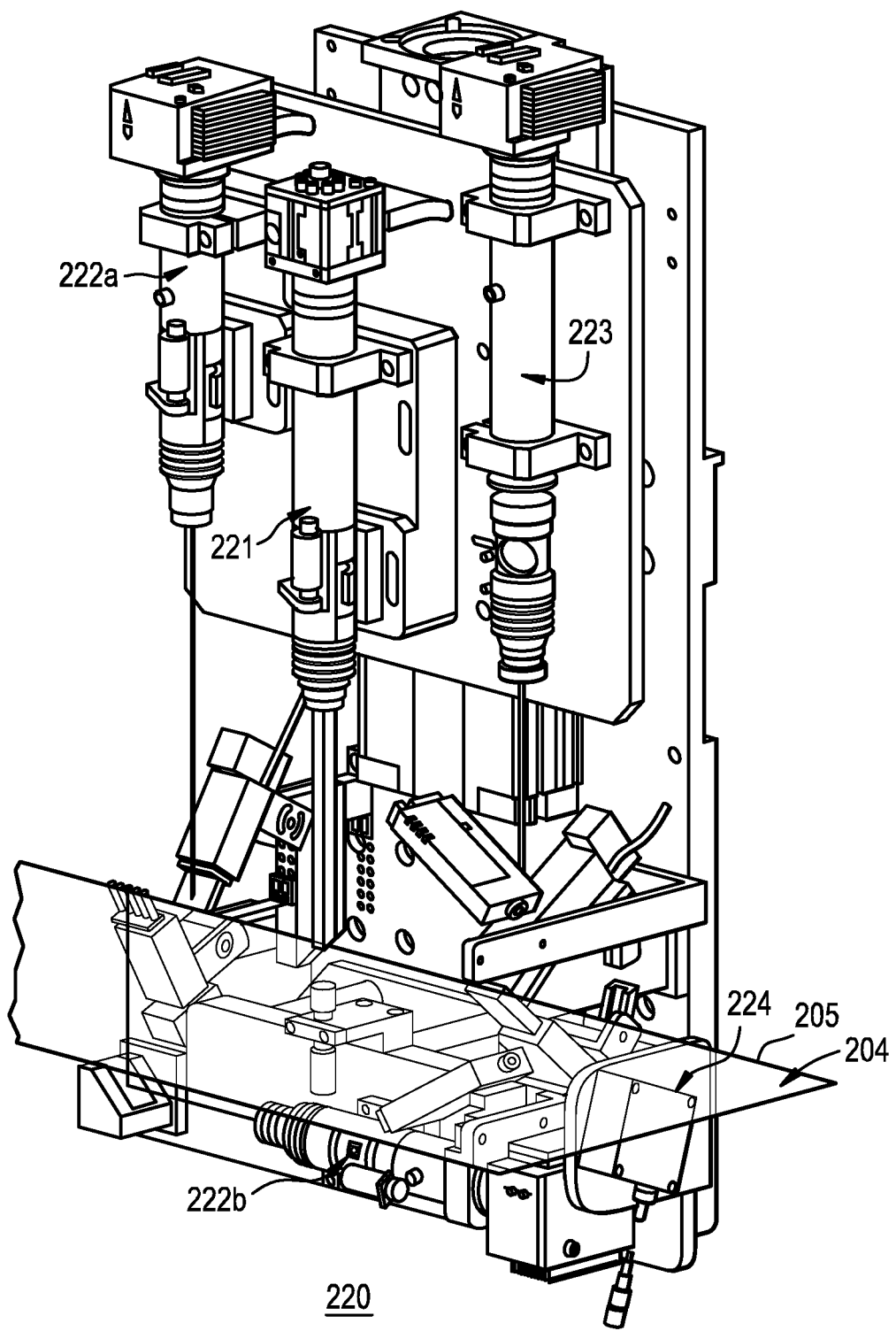
FIGS. 6A and 6B are perspective views of an exemplary optical sensor for the system of FIG. 2.
Figure 6B:
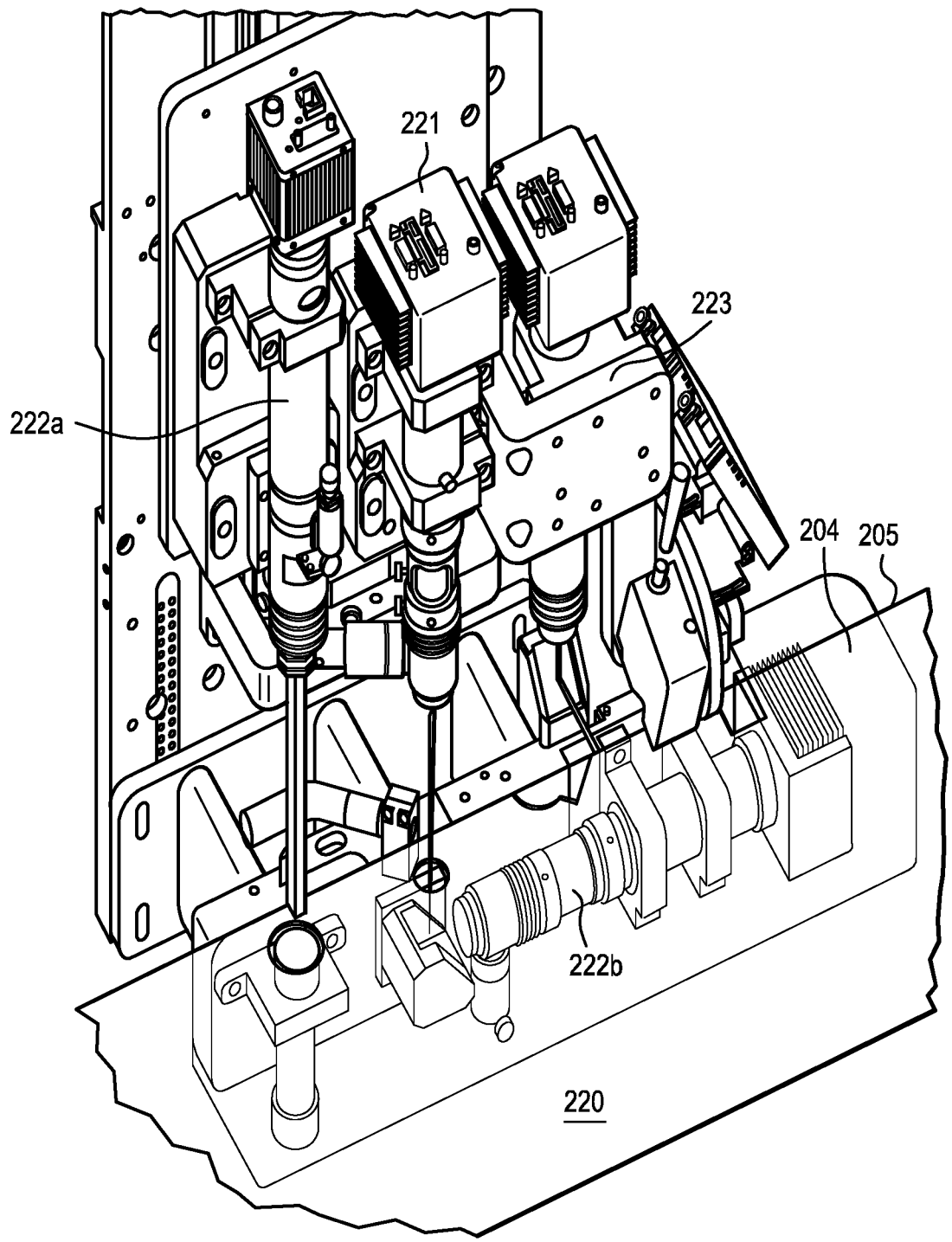

FIGS. 6A and 6B are perspective views of an exemplary optical sensor for the system of FIG. 2. With reference to FIGS. 6A and 6B, an exemplary optical sensor module or suite 220 may include a surface area scan camera 221 which can be configured to perform a pre-scan inspection of a surface of a glass sheet 204 in close proximity to an edge 205 thereof. In some embodiments, a pre-scan inspection can detect areas of debris which, if present, can be correlated with edge failures. These can then be used to provide post measurement inspection functionality for direct comparison with pre-failure edge appearance. The optical sensor suit 220 may also include in some embodiments one or more bevel width line scan cameras 222a-b which can be configured to perform a pre-scan evaluation of A and/or B side bevel width and can also provide a determination of factor of symmetry. In some embodiments, bevel width anomalies resulting from finishing process variations can be tied to edge failure. These can then be used to provide post measurement inspection functionality for direct comparison with pre-failure edge appearance. In additional embodiments, the suite 220 can include a normal incidence edge inspection line scan camera 223 which can be configured to perform a normal incidence pre-scan inspection of the edge 205. This inspection can be used to provide post measurement inspection functionality for direct comparison with pre-failure edge appearance. In further embodiments, the suite 220 can include one or more optical displacement sensors 224 which can be configured to perform a pre-scan measurement of glass thickness near the edge 205 and provide a surface displacement relative to the table 202 (not shown) position which may be representative of table flatness. In some embodiments, cameras can be incorporated allowing for correlation of edge features with edge strength. For example, one camera 222a observes the A bevel, one camera 222b observes the B bevel, and one camera 223 observes the edge face. Exemplary embodiments can use these cameras to generate a fundamental understanding of how edge features (roughness, symmetry, chips, etc.) correlate with edge strength by performing a pre-scan prior to edge strength testing and thus allowing for quick establishment of how edge features correspond to edge strength. Again, it should be noted that while some embodiments are described with reference to a glass sheet 204 and features (e.g., bevel) thereof, the claims appended herewith should not be so limited as an exemplary ESMS 200 can be utilized to accept or accommodate and analyze laminate structures or panels and their respective features.

Edge Strength Measurements and Inspection

As noted above, conventional edge strength measurement and inspection employs individual coupons and bends them in a tangential direction to the surface of the glass. Each measurement is destructive and is sensitive in detecting out of plane bending failures as well as impact failures occurring at the edge apex. Historically, impact failures were due to glass bumping into alignment dowel pins in a customer conveyance system. Noncontact vision system alignment methods have resulted in edge failures being primarily due to interrogation of flaws through out-of-plane bending modes. Exemplary ESMS embodiments described herein are an out-of-plane method for testing strength of glass edges through a horizontal bending mode. FIG. 7 is a block diagram of some embodiments. With reference to FIG. 7, a method 700 is provided in which individual roller assemblies (each comprised of three or four rollers in a three- or four-point bending geometry) can be used to pinch a glass edge at a defined displacement which corresponds to a given stress at step 702. The rollers can then be driven along a length of a tested edge at step 704, the stress recorded at each defined gage length at step 706, and at step 708 a determination may be made whether or not the glass broke ("P" or "F"). By measuring several sheets in order of increasing (or decreasing) stress, a Weibull strength distribution can be derived at step 710 using the failure data ("F") along with associated suspensions ("P"). The resulting method is a hybrid type of proof testing that provides high throughput quantitative strength information for increased quality control as well as near-immediate finishing process feedback, while avoiding any adverse effects in turnaround time.

Conventional inspection methods utilize over one hundred full time employees working exclusively on making V4PTB measurements on glass edge samples. Even with this large commitment of manpower, only a very small fraction of total production can be tested. This leads to quality leakage in the form of bad product reaching the customer stemming from the low frequency of testing. Also, because nearly all allocated resources are committed to keeping up pace with quality requirements, there is little or no opportunity for process optimization studies to help improve product quality. Conventional methods thus create a precarious situation where one may be making poor product but does not have the bandwidth to intercept this product before it leaves or to ascertain on how to fix the problem. Exemplary embodiments, however, lead to a drastic reduction in the amount of time devoted to edge quality control, a dramatic increase in total glass tested versus glass produced, a dramatic increase in the percentage of edge perimeter tested, and a means for simultaneous process feedback for use in pursuit of product improvement.

Figure 8A:
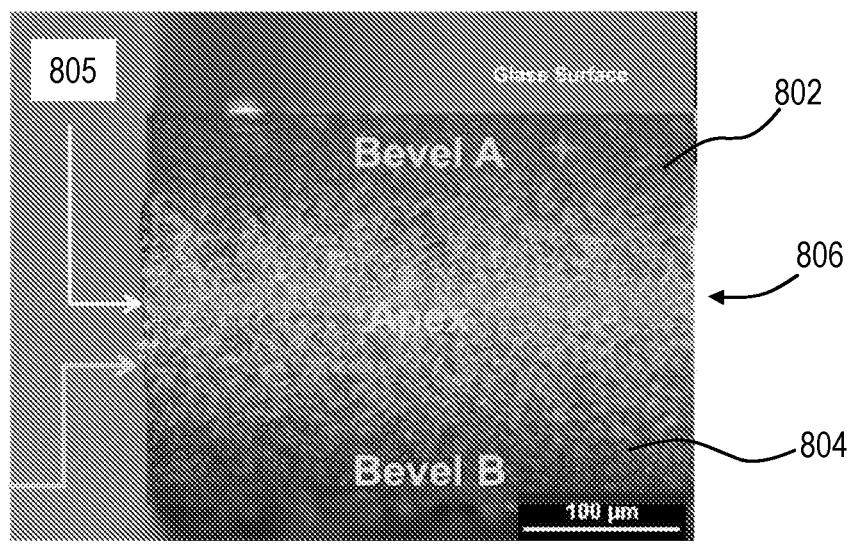
FIGS. 8A and 8B are plan and cross-sectional images of a finished glass edge.
Figure 8B:
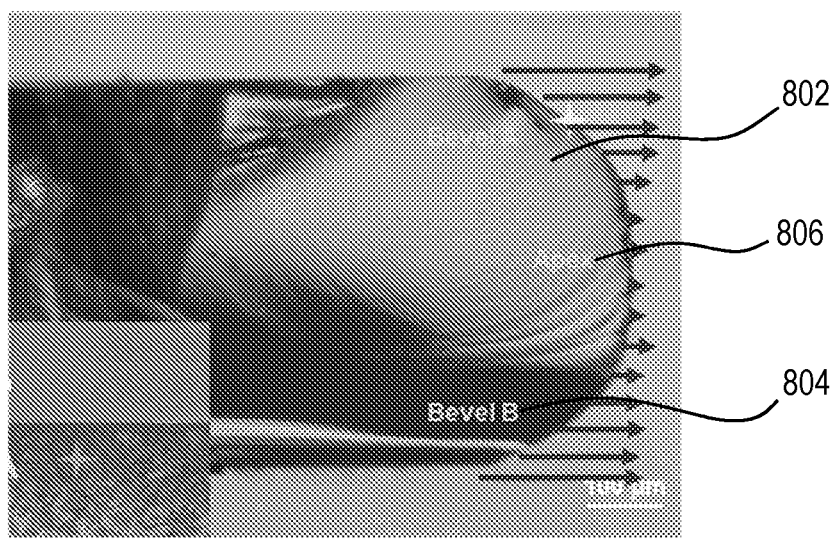

Furthermore, because of the roller geometry implemented in exemplary embodiments, specific regions of a beveled edge may be interrogated and associated strength distributions derived applicable only to those areas. FIGS. 8A and 8B provide plan and cross-sectional images of a finished glass edge. With reference to FIGS. 8A and 8B, the A bevel 802, B bevel 804 and apex 806 of a glass edge 805 may be interrogated providing separate strength distributions for any one or several of these regions. Unlike conventional methods (V4PTB), exemplary embodiments can measure up to the edge and corners of a glass sheet as the roller geometry of such embodiments allow for evaluation of edge strength up to at least 5 mm or less from the end of an edge, thus enabling greater than 95% edge coverage using one measurement technique. Table 1 below provides some of the key advantages of exemplary ESMS embodiments relative to V4PTB.

TABLE 1

| Measurement comparison | | |
| --- | --- | --- |
|  | V4PTB | ESMS |
| Total Test Edge Coverage | ~30% | >95% |
| Corner Testing | Within 50 mm | Within 5 mm or less |
| Test Cycle time (Gen 6 sheet) | 8 hours | <10 min |
| A and B side edge discrimination | No | Yes |
| Other process data recorded for finishing line | No | Yes |

Of course, the claims should not be limited to interrogation of just edge features as it is envisioned that embodiments can interrogate surface features as well. For example, some features on the surface of the glass sheet, e.g., particle contamination and/or visible types of surface defects such as pits, chips or scratches, can be employed with embodiments of the present subject matter. In such embodiments, however, rather than providing strength distributions, the embodiments would utilize size, shape and/or depth distributions, i.e., a dimensional metric, of such surface defects. Exemplary and non-limiting surface features include surface proximity regions (e.g., approximately 20 mm inboard from the edge) and interface regions (where the surface meets the edge) and any size, shape or depth feature of surface defects. Such dimensional metrics can be used alone or with strength metrics obtained from edge features.

As mentioned above, edge strength measurement and inspection methods using the embodiments described above may be based on Weibull statistics and may be selected when using four point vertical bending data sets or other data sets depending upon system configuration. For example, an exemplary ESMS embodiment may provide measurement states and correlate such states with measured bending data sets. As ESMS can provide measurements of consecutive lengths along a full sheet edge, some parts may fail (break) and some may pass (not break). Using this information, a strength distribution can be derived for a defined test length or edge of a glass sheet. In one experiment, a test length of 51 mm was selected, however, this length is exemplary only and can be an adjustable setting within an exemplary ESMS framework. For example, the test length may span the entirety of a glass sheet edge or may be conducted on a portion(s) of a glass sheet edge. Thus, the test length may span from as little as about 1 mm to 5 mm to as much as about 2600 mm, 3000 mm, 4000 mm or more depending upon the length of the glass edge.

Figure 9:
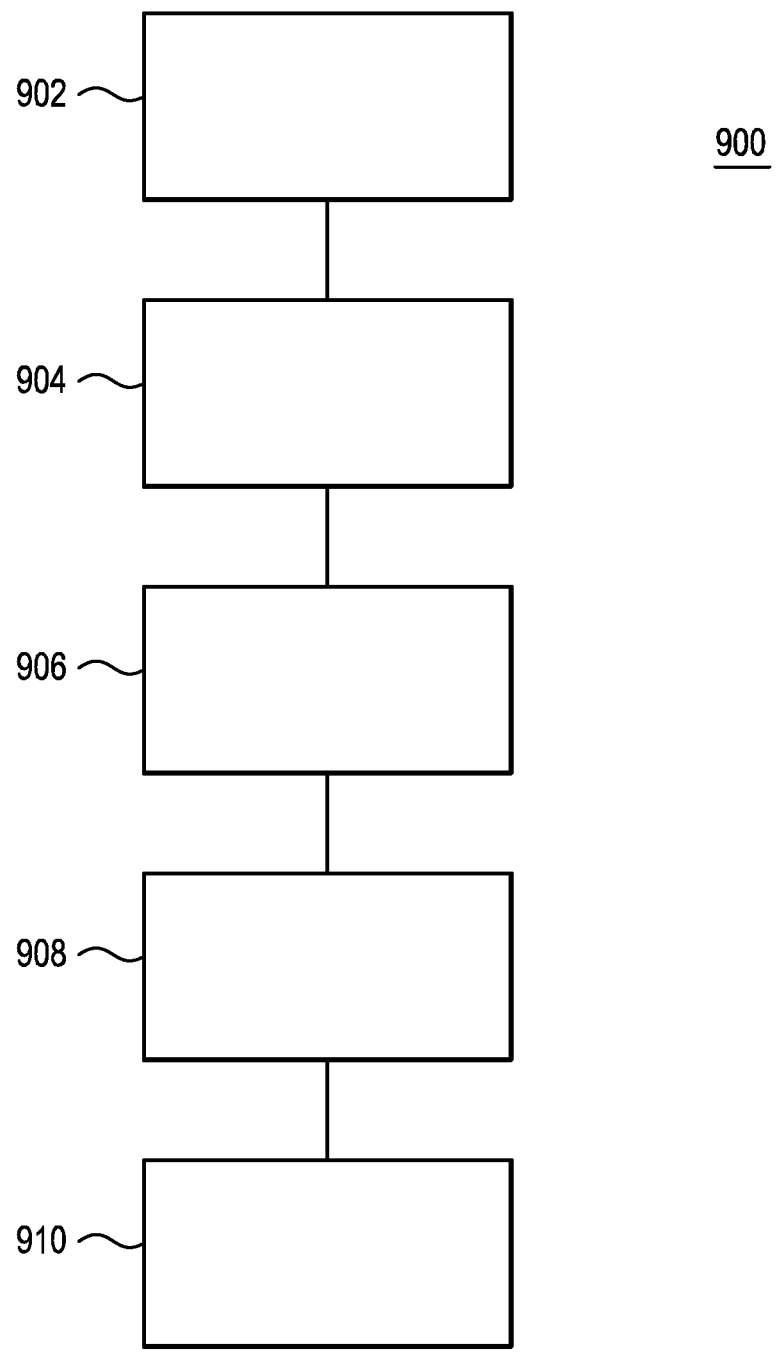
FIG. 9 is a block diagram depicting some embodiments of the present subject matter.

Because a strength distribution is ultimately desired, an ESMS measurement cycle approach can be defined in some embodiments. FIG. 9 is a block diagram depicting some embodiments of the present subject matter. With reference to FIG. 9, an exemplary, non-limiting ESMS measurement cycle 900 is depicted whereby the cycle can include selecting any number of glass sheets (e.g., consecutive sheets off of a given finishing line, packing crate, or selected sheets off a given finishing line, packing crate) at step 902. Edge strength can then be measured using the embodiments depicted in FIGS. 1-6 along any portion of or all of a single edge or multiple edges of the glass sheets at step 904. Any one or several of these sheets can then be measured at variable stresses at step 906. An exemplary embodiment can then divide each measured test length into individual gage lengths and record predetermined parameters during the testing and measurement process at step 908. This data can then be tabulated across all stresses, sheets, locations, etc. and used to calculate a strength distribution using Weibull statistics at step 910. For example, some embodiments can calculate strength distributions using previous glass distribution data alone or in combination with theoretical modeling data. These or other embodiments can calculate gage length values based on actual test parameters. In additional embodiments, an exemplary ESMS can determine strength distributions by selecting an arbitrary gage length value and calculating failure rates using Weibull statistical approaches.

In some embodiments a method of testing a sheet of brittle material is provided. The method can include the steps of measuring one or more edge features of a sheet of brittle material, imparting a bend to the sheet of brittle material, producing relative motion between the sheet and the bend such that the bend traverses the sheet, inducing a stress in the sheet as a function of the relative motion and imparted bend, wherein the induced stress corresponds to a predetermined strength value, and correlating the measured one or more edge features with the strength value. In some embodiments, the step of measuring one or more edge features occurs before the steps of imparting a bend to the sheet, producing relative motion, and inducing a stress in the sheet. In other embodiments, the step of producing relative motion further comprises passing the sheet of brittle material between at least two opposing assemblies each having one or more arcuate members thereon. In additional embodiments, a first of the at least two opposing assemblies has a single arcuate member engaging a first side of the sheet and a second of the at least two opposing assemblies has two arcuate members engaging a second side of the sheet in opposition to the first side. In some embodiments, the step of producing relative motion further comprises engaging the sheet with the one or more arcuate members at a distance no more than about 2 mm from an edge of the sheet. Exemplary arcuate members can have a diameter of about 9 mm and/or can comprise a compliant material. In some embodiments, the step of measuring further comprises optically detecting data for one or more edge features of the sheet and providing strength distributions for each feature. Exemplary edge features can be, but are not limited to an A-bevel, a B-bevel, and an apex of an edge of the sheet. In other embodiments, the relative motion occurs over the length of the sheet up to five mm or less from an edge orthogonal to the relative motion. Exemplary brittle materials include, but are not limited to, a glass or a glass ceramic. The sheet can have a length ranging from about 600 mm to 4000 mm and a width ranging from about 600 mm to 4000 mm and/or a thickness of less than 0.1 mm or ranging from about 0.1 mm to about 3 mm. In some embodiments, the step of inducing a stress in the sheet further comprises monitoring for fracture of the sheet and controlling the imparted bend as a function of said monitoring. An exemplary relative motion can range from about 50 mm/sec to about 500 mm/sec.

In other embodiments, a method of proof testing a sheet of brittle material is provided. The method can comprise the steps of measuring one or more edge features of a sheet of brittle material, imparting a bend to the sheet and producing relative motion between the sheet and the bend such that the bend traverses the sheet, inducing a stress in the sheet as a function of the relative motion and imparted bend, wherein the induced stress corresponds to a predetermined strength value, and correlating the measured one or more edge features with the strength value to detect edge features that correspond to edge strengths less than or greater than the predetermined strength value. In some embodiments, the step of measuring further comprises optically detecting data for one or more surface or edge features of the sheet and providing strength distributions for each feature. In other embodiments, the one or more surface or edge features is selected from the group consisting of an A-bevel, a B-bevel, and an apex of an edge of the sheet. Exemplary brittle materials include, but are not limited to, a glass or a glass ceramic.

Figure 10:
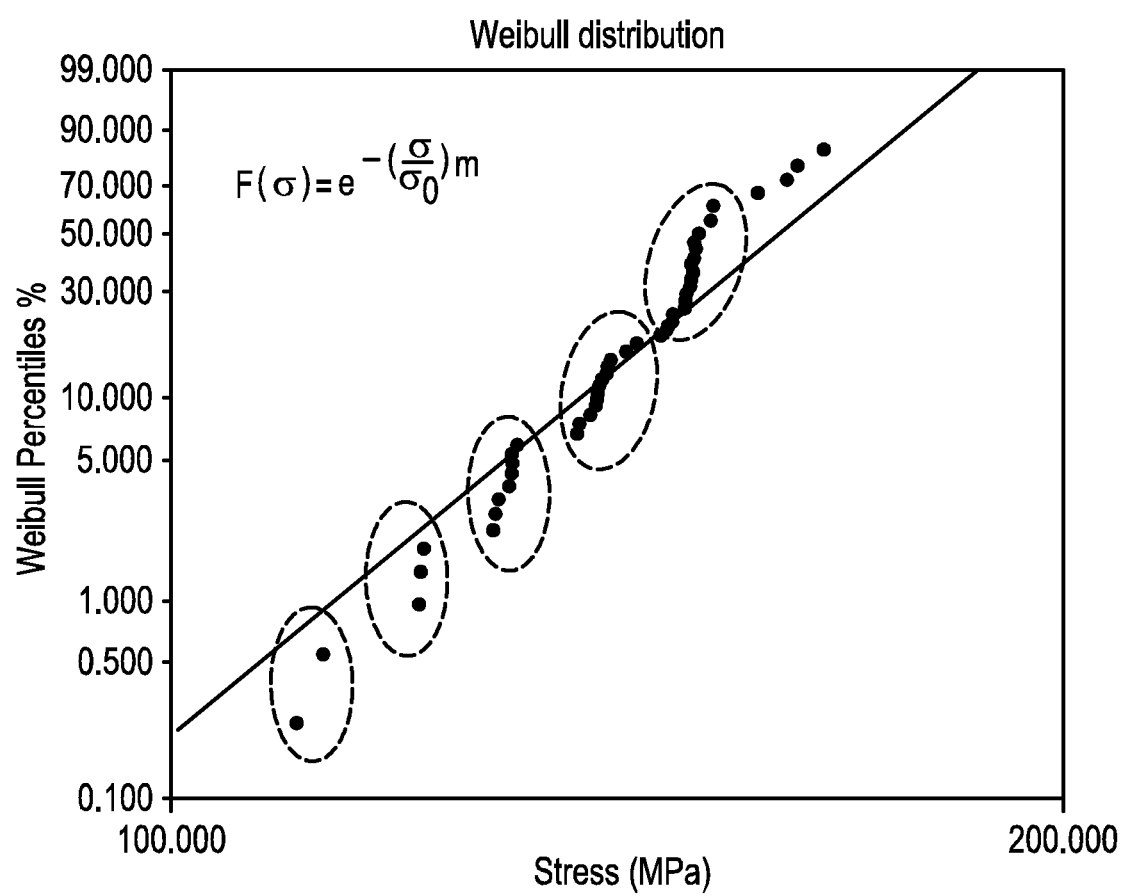
FIG. 10 is a graphical depiction of a representative Weibull distribution according to some embodiments.

In one non-limiting experiment, a cycle of five sheets was selected and measured from 110 MPa to 150 MPa in increments of 10 MPa (e.g., 110 MPa, 120 MPa, 130 MPa, 140 MPa and 150 MPa). Edge strength measurements were then taken along each of the four edges of each selected sheet. It should be noted that these stress values and increments are exemplary only, should not limit the scope of the claims appended herewith, and in this experiment, were selected based upon historical data and targeted to explore the low strength portion of a flaw population. At the conclusion of a single measurement cycle, a Weibull strength distribution was derived, showing a distinct cluster of data corresponding to each sheet measured as depicted in FIG. 10. With reference to FIG. 10, a depiction of a representative Weibull distribution is provided, $F(\sigma)=\exp[-(\sigma/\sigma_0)^m]$ where m represents shape (slope) and $\sigma_0$ represents scale, characteristic strength, from a single cycle where five distinct clusters of data corresponding to each of the five sheets measured was observed. A quantification of production lot edge strength using just these five sheets was achieved by a single operator using embodiments of the present subject matter in a considerably short period of time (e.g., less than 50 minutes) as opposed to the twenty four or more hours required using conventional means. Depending upon edge strength measured and tested, grade qualities can be provided to the respective glass sheets and/or respective lots. Additional experiments were conducted to collect edge strength measurements on a wide variety of glass sheets and panels or laminate structures. Exemplary ESMS embodiments can be used to measure edge strengths from 100 MPa up to 200 MPa and all subranges therebetween. It was also discovered that for strengthened glass (e.g., chemically strengthened (ion exchanged), acid etched, or the like), edge strength measurements greater than 200 MPa (e.g., from 200 MPa to 350 MPa, from 200 MPa to 300 MPa, and all subranges therebetween) can be performed.

Figure 11:
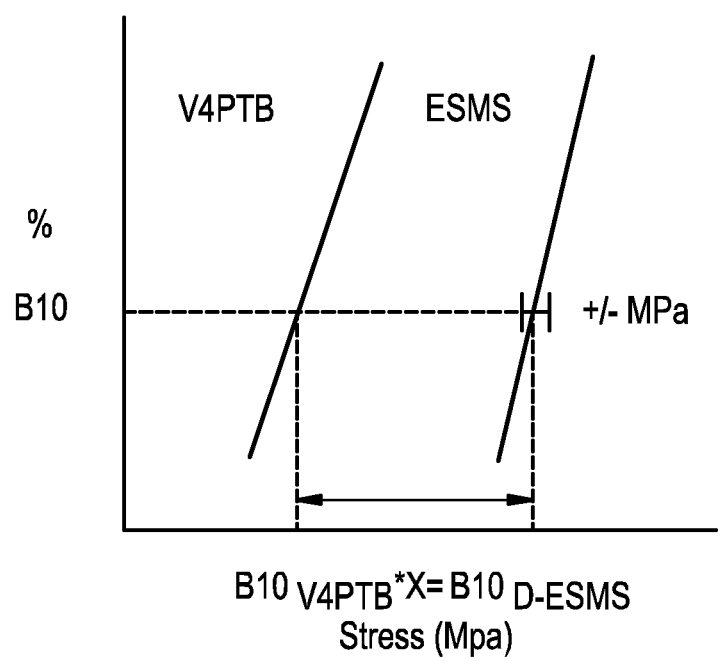
FIG. 11 is a graphical illustration of B10 ratio for some embodiments.
Figure 12:
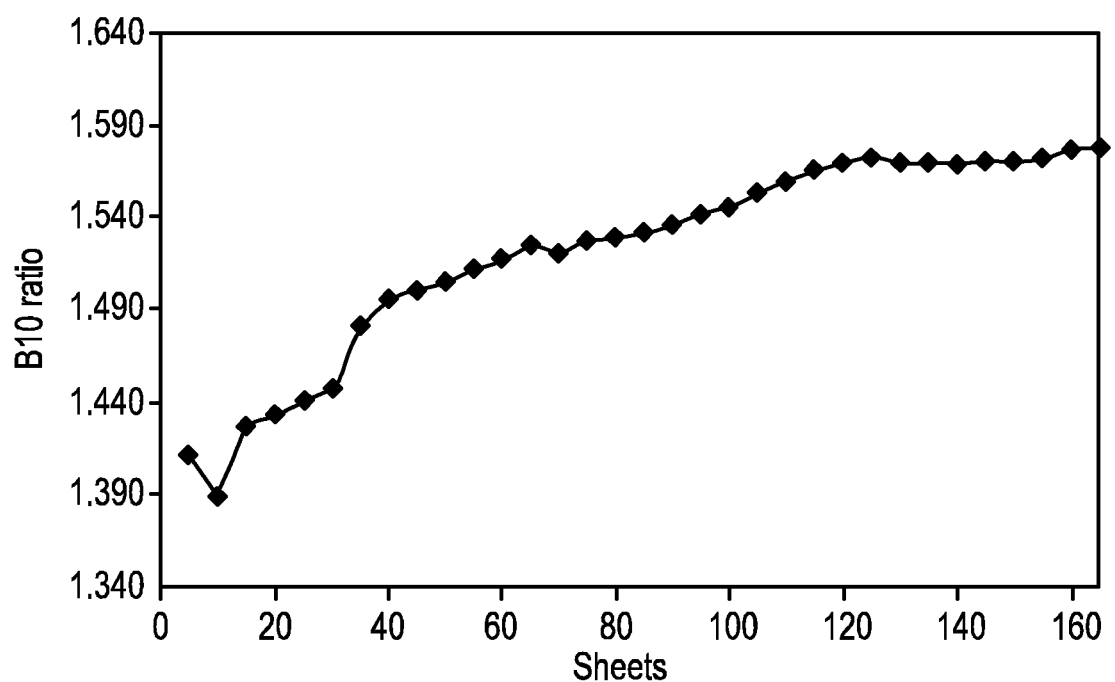
FIG. 12 is a graphical illustration of B10 ratio values as a function of sheet numbers for some exemplary embodiments.
Figure 13:
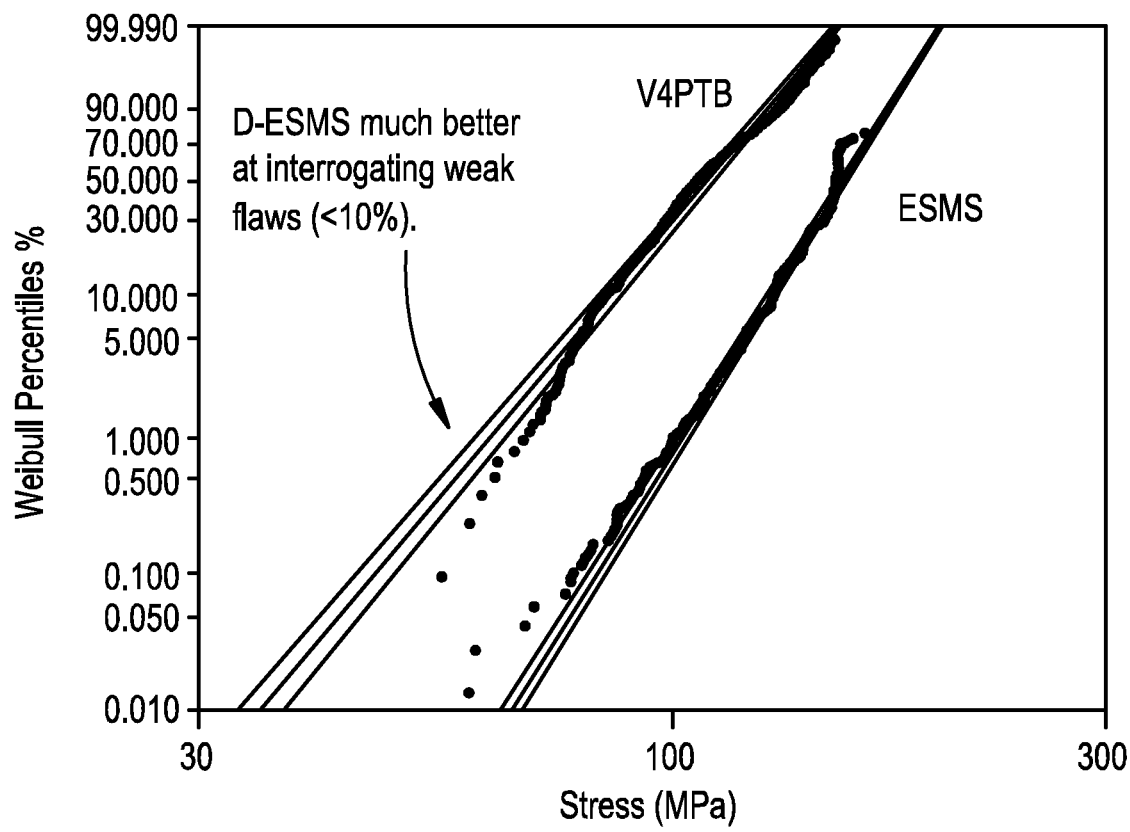
FIG. 13 is a graphical depiction showing global Weibull distributions for some trial experiments.

To assess ESMS measurement cycle performance over time, field experiments were also conducted on segments using production glass of Corning Incorporated Eagle XG® glass at different manufacturing sites. The thickness of this glass was about 0.5 mm with 165 sheets measured at the two sites using ESMS and 35 sheets using V4PTB. One output from these experiments was to assess how a main grading metric (B10 value on the Weibull plot) can vary over a production lot as measured by ESMS embodiments and how this value tracked with respect to prior art measurement methods (V4PTB) measurement on the same glass (B10 (ESMS)/B10 (V4PTB) ratio). As is understood in the industry, BX or Bearing Life nomenclature refers to the time at which X % of items in a population will fail. B10 thus refers to the time at which 10% of items in a population will fail. FIG. 11 is a graphical illustration of B10 ratio for some embodiments and FIG. 12 is a graphical illustration of B10 ratio values as a function of sheet numbers for some exemplary embodiments. With reference to FIGS. 11 and 12, the B10 ratio value over the entire course of these field experiments is illustrated with each data point on the plot generated at the conclusion of each ESMS cycle by calculating the B10 ratio using moving average values for B10 from both ESMS and V4PTB processes. V4PTB data was intermittently generated from sets of 6 sheets located, relative to production order, between blocks of 25 sheets (five ESMS measurement cycles). Overall, this approach was meant to simulate measurements from the two techniques on a continuous flow of glass produced by a system. The data in FIG. 12 illustrates an initial period of data fluctuation (due to dataset growth as well as new roller burn in effect), followed by eventual stabilization suggesting that the method, as well as its relationship to the incumbent technology, is both repeatable and predictable. FIG. 13 is a graphical depiction showing global Weibull distributions for trial experiments, and Table 2 below provides statistical parameters for the measurement techniques.

TABLE 2

| Parameter | ESMS | V4PTB |
| --- | --- | --- |
| Scale | 162 | 114.79 |
| Shape | 9.96 | 7.71 |
| B10 | 129.07 | 85.75 |
| +/− scale | 1.35 (0.8%) | 0.98 (0.9%) |
| +/− shape | 0.39 (3.9%) | 0.34 (4.4%) |
| +/− B10 | 0.8 (0.6%) | 1.65 (1.9%) |

With reference to FIG. 13 and Table 2, Weibull distributions using the data collected over all measurement cycles for ESMS and V4PTB are illustrated. Using 2-sided 90% confidence bounds, it can be observed that ESMS data is not only more effective at interrogation of weak flaws (a critical concern by customers) but is also less variable within each distributional metric (B10, shape and scale) than conventional measurement techniques (V4PTB).

Exemplary embodiments have been described directed to a method for the continuous measurement of the breaking strength of a glass edge by putting only the edge under stress, such that stresses away from the edge are significantly less than the breaking strength at their respective locations. Additionally, using exemplary embodiments both sides of an edge can be subject to substantially the same tensile stress during the measurement. One method to provide this continuous stress has been described in detail (e.g., opposed and offset rollers), but the claims appended herewith should not be so limited as it is envisioned that acoustic energy and/or infrared energy (both coherent and incoherent) can also be used for the same purpose to induce stress at the edge of a glass sheet. For example, focused ultrasound can be used to induce stress at a glass edge and exemplary ESMS measurements taken therefrom. Further, IR irradiation using a laser or other means (at a spectrum in which a respective glass material may have significant absorption) may also be used to induce stress at a glass edge and exemplary ESMS measurements taken therefrom. Additionally, exemplary embodiments provide a continuous high speed nature which results in at least a 30× increase in processing speed, at least a 3× increase in the amount of edge tested, and orders of magnitude of sheets processed and tested over conventional methods. This increase in statistical sampling can thus guarantee less leakage to the customer and is amenable to online configurations.

Embodiments and the functional operations described herein can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine readable storage substrate, a memory device, or a combination of one or more of them.

The term "processor" or "controller" can encompass all apparatus, devices, and machines for processing data, including by way of embodiment a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of embodiment, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of embodiment semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user and as shown in the Figures contained herein, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for embodiment, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described herein, or any combination of one or more such back end, middleware, or front end components. The components of the system can be interconnected by any form or medium of digital data communication, e.g., a communication network. Embodiments of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having two or more such components unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of testing a sheet of brittle material comprising the steps of:
    measuring one or more edge features of a sheet of brittle material;
    imparting a bend to the sheet of brittle material;
    producing relative motion between the sheet and the bend such that the bend traverses the sheet, wherein producing the relative motion comprises passing the sheet of brittle material between at least two opposing assemblies each of the at least two opposing assemblies having one or more arcuate members thereon, wherein the one or more arcuate members engage the sheet at a distance of no more than about 2 mm from an edge of the sheet;
    inducing a stress in the sheet as a function of the relative motion and imparted bend, wherein the induced stress corresponds to a predetermined strength value; and
    correlating the measured one or more edge features with the strength value.

2. The method of claim 1, wherein the step of measuring one or more edge features occurs before the steps of imparting a bend to the sheet, producing relative motion, and inducing a stress in the sheet.

3. The method of claim 1, wherein a first of the at least two opposing assemblies has a single arcuate member engaging a first side of the sheet and a second of the at least two opposing assemblies has two arcuate members engaging a second side of the sheet in opposition to the first side.

4. The method of claim 1, wherein the arcuate members have a diameter of about 9 mm.

5. The method of claim 1, wherein the arcuate members comprise a compliant material.

6. The method of claim 1, wherein the step of measuring further comprises optically detecting data for one or more edge features of the sheet and providing strength distributions for each feature.

7. The method of claim 6, wherein the one or more edge features is selected from the group consisting of an A-bevel, a B-bevel, and an apex of an edge of the sheet.

8. The method of claim 1, wherein the relative motion occurs over a length of the sheet up to five mm or less from an edge orthogonal to the relative motion.

9. The method of claim 1, wherein the brittle material comprises a glass or a glass ceramic.

10. The method of claim 1, wherein the sheet has a length ranging from about 600 mm to 4000 mm and a width ranging from about 600 mm to 4000 mm.

11. The method of claim 1, wherein the sheet has a thickness of less than 0.1 mm.

12. The method of claim 1, wherein the sheet has a thickness ranging from about 0.1 mm to about 3 mm.

13. The method of claim 1, wherein the step of inducing a stress in the sheet further comprises monitoring for fracture of the sheet and controlling the imparted bend as a function of said monitoring.

14. The method of claim 1, wherein the relative motion ranges from about 50 mm/sec to about 500 mm/sec.

15. The method of claim 1, wherein the sheet of brittle material further comprises a laminate structure or panel having a plurality of glass substrates or sheets.

16. The method of claim 1, wherein the step of measuring further comprises optically detecting data for one or more surface features of the sheet and providing dimensional metrics for each surface feature.

17. The method of claim 16, wherein the one or more surface features is selected from the group consisting of surface defects in surface proximity regions, and surface defects in interface regions of the sheet.

18. A method of proof testing a sheet of brittle material comprising the steps of:
   measuring one or more edge features of a sheet of brittle material;
   imparting a bend to the sheet and producing relative motion between the sheet and the bend such that the bend traverses the sheet;
   inducing a stress in the sheet as a function of the relative motion and imparted bend, wherein the induced stress corresponds to a predetermined strength value; and
   correlating the measured one or more edge features with the strength value to detect edge features that correspond to edge strengths less than or greater than the predetermined strength value,
   wherein measuring one or more edge features of a sheet of brittle material further comprises optically detecting data for one or more surface or edge features of the sheet and providing strength distributions for each feature.

19. The method of claim 18, wherein the one or more surface or edge features is selected from the group consisting of an A-bevel, a B-bevel, and an apex of an edge of the sheet.

20. The method of claim 18, wherein the brittle material comprises a glass or a glass ceramic.

21. The method of claim 18, wherein the sheet of brittle material further comprises a laminate structure or panel having a plurality of glass substrates or sheets.

22. An apparatus for testing a sheet of brittle material comprising:
   detection mechanisms for measuring one or more edge features of a sheet of brittle material;
   a plurality of assemblies for imparting a bend to the sheet of brittle material, producing relative motion between the sheet and the bend such that the bend traverses the sheet, wherein a first of the plurality of assemblies has a single arcuate member engaging a first side of the sheet and a second of the plurality of assemblies has two arcuate members engaging a second side of the sheet in opposition to the first side, wherein the plurality of assemblies engage the sheet at a distance of no more than about 2 mm from an edge of the sheet, and inducing a stress in the sheet as a function of the relative motion and imparted bend, wherein the induced stress corresponds to a predetermined strength value; and
   circuitry for correlating the measured one or more edge features with the strength value.

23. The apparatus of claim 22, wherein the arcuate members have a diameter of about 9 mm and comprise a compliant material.

24. The apparatus of claim 22 wherein the detection mechanisms include cameras for optically detecting data for one or more edge features of the sheet and providing strength distributions for each feature.

25. The apparatus of claim 22, wherein the sheet of brittle material further comprises a laminate structure or panel having a plurality of glass substrates or sheets.

26. A method of testing a sheet of brittle material comprising the steps of:
   measuring one or more features of a sheet of brittle material;
   imparting a bend to the sheet of brittle material;
   producing relative motion between the sheet and the bend such that the bend traverses the sheet, wherein producing the relative motion comprises passing the sheet of brittle material between at least two opposing assemblies each of the at least two opposing assemblies having one or more arcuate members thereon, wherein the one or more arcuate members engage the sheet at a distance of no more than about 2 mm from an edge of the sheet;
   inducing a stress in the sheet as a function of the relative motion and imparted bend, wherein the induced stress corresponds to a predetermined strength value; and
   correlating the measured one or more features with the strength value.

27. The method of claim 26, wherein the step of measuring one or more features occurs before the steps of imparting a bend to the sheet, producing relative motion, and inducing a stress in the sheet.

28. The method of claim 26, wherein the step of measuring further comprises optically detecting data for one or more edge features or one or more surface features of the sheet and providing strength distributions for each edge feature or providing dimensional metrics for each surface feature.

29. The method of claim 26, wherein the one or more features is selected from the group consisting of an A-bevel, a B-bevel, an apex of an edge, surface defects in surface proximity regions, and surface defects in interface regions of the sheet.

30. The method of claim 26, wherein the sheet of brittle material further comprises a laminate structure or panel having a plurality of glass substrates or sheets.

* * * * *

UNITED STATES PATENT AND TRADEMARK OFFICE
CERTIFICATE OF CORRECTION

PATENT NO. : 10,613,007 B2  
APPLICATION NO. : 15/557991  
DATED : April 7, 2020  
INVENTOR(S) : Gabriel Pierce Agnello et al.

It is certified that error appears in the above-identified patent and that said Letters Patent is hereby corrected as shown below:

On the Title Page

On page 2, in Column 2, item (56), Other Publications, Line 14, delete "Galss" and insert -- Glass --, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*